(12) United States Patent
Joushita (10) Patent No.: US 7,228,933 B2
(45) Date of Patent: Jun. 12, 2007

(54) ELECTRIC POWER STEERING DEVICE AND JOINT

(75) Inventor: Kaname Joushita, Aichi (JP)

(73) Assignee: Koyo Seiko Co., Ltd., Chuo-ku, Osaka (JP)

( * ) Notice: Subject to any disclaimer, the term of this patent is extended or adjusted under 35 U.S.C. 154(b) by 0 days.

(21) Appl. No.: 10/695,456

(22) Filed: Oct. 29, 2003

(65) Prior Publication Data
US 2005/0072620 A1 Apr. 7, 2005

(30) Foreign Application Priority Data
Oct. 30, 2002 (JP) ............... P.2002-316480

(51) Int. Cl.
*B62D 5/04* (2006.01)
(52) U.S. Cl. ............ 180/444; 180/443; 464/73; 464/92
(58) Field of Classification Search ........ 180/443, 180/444; 74/425, 388 PS; 464/73, 92, 149
See application file for complete search history.

(56) References Cited

U.S. PATENT DOCUMENTS

| | | | |
|---|---|---|---|
| 3,313,125 A | | 4/1967 | Hein |
| 4,384,858 A | * | 5/1983 | Kronert et al. ............... 464/56 |
| 4,968,286 A | * | 11/1990 | McGuire ...................... 464/51 |
| 5,482,127 A | * | 1/1996 | Eda et al. .................... 180/443 |
| 6,044,723 A | * | 4/2000 | Eda et al. ............... 74/388 PS |
| 6,123,620 A | | 9/2000 | Polakowski |
| 6,364,049 B1 | * | 4/2002 | Iwasaki et al. ............. 180/444 |
| 6,390,230 B1 | * | 5/2002 | Shimizu et al. ............. 180/444 |
| 6,491,131 B1 | * | 12/2002 | Appleyard .................. 180/444 |
| 6,550,567 B2 | * | 4/2003 | Murakami et al. .......... 180/444 |
| 6,782,771 B2 | * | 8/2004 | Oka et al. ............... 74/388 PS |

FOREIGN PATENT DOCUMENTS

| | | |
|---|---|---|
| DE | 1 525 365 | 6/1971 |
| DE | 44 37 239 | 4/1996 |
| GB | 1 110 027 | 4/1968 |
| GB | 1 318 785 | 5/1973 |
| JP | 2002-145083 | 5/2002 |

* cited by examiner

*Primary Examiner*—Lesley D. Morris
*Assistant Examiner*—L. Lum
(74) *Attorney, Agent, or Firm*—McGinn IP Law Group, PLLC (57) ABSTRACT

In order to solve a problem of an electric power steering device of an automobile that the steering feeling is deteriorated by dragging the inactive electric motor if a steering member is operated at a small angle to leave an electric motor inactive while the automobile is running straight, the present invention provides a joint for jointing the rotary shaft of a steering assisting electric motor and a worm shaft of a reduction mechanism, comprising a first member rotating integrally with the rotary shaft; a second member rotating integrally with the worm shaft; and an elastic member for coupling the two members in a torque transmittable manner. The elastic member has a relatively small elastic modulus according to the state that the torsion angle between the first and second members is small. Accordingly, the structure and characteristics thereof lead to a better operationality of the steering member.

22 Claims, 6 Drawing Sheets

ELECTRIC POWER STEERING DEVICE AND JOINT

BACKGROUND OF THE INVENTION

1. Field of the Invention

The present invention relates to an electric power steering device of an automobile and to a joint to be used in the electric power steering device.

2. Description of the Related Art

In the electric power steering device, a steering assisting force is obtained by an electric motor, the vibrations of which are transmitted through a steering shaft to the compartment of the automobile thereby to cause noises. These noises are serious especially in a hybrid car or an electric car, which intrinsically has a quiet compartment.

In an ordinary construction, the rotary shaft of the electric motor is so rigidly connected to a worm shaft by a serration joint or the like as to rotate together, and is connected in a torque transmittable manner to the steering shaft through the worm shaft and a worm wheel.

In order to prevent the steering assisting force of the electric motor from being unnecessarily fluctuated by a kickback applied from the road surface through the wheels to the steering shaft, there has been provided an electric power steering device (e.g., Patent Publication 1), in which a torque transmitting elastic member is interposed between the rotary shaft of the electric motor and one end of the worm shaft.

[Patent Publication 1]
    JP-A-2002-145083

Here, the aforementioned steering assisting force of the electric motor is generated on the basis of a detection signal from a torque sensor for detecting the torsion of a torsion bar leading to the steering shaft.

Therefore, the steering assisting force is not generated in case the steering member such as a steering wheel is manipulated (or steered) by such an extremely small steering angle as hardly steers the steering shaft.

In this case, therefore, the steering wheel is steered while dragging (or turning as a load) the rotary shaft of the inactive electric motor. As a result, the starting torque at the time of starting the steering operation of the steering member thereby to deteriorate the steering feeling.

This defect likewise occurs in case the rotary shaft of the electric motor and the worm shaft are rigidly connected through the serration joint or elastically connected through the elastic member, as in Patent Publication 1.

This is because, even in the electric power steering device of Patent Publication 1, it is necessary for transmitting the torque to use an elastic member having considerably hard characteristics, which is hardly deformed at a small steering angle.

SUMMARY OF THE INVENTION

The present invention has been conceived in view of the problems thus far described and has an object to provide an electric power steering device capable of improving the steering feeling of a small-angle steering at a straight running time, and a joint to be used in the electric power steering device.

According to the invention of claim 1, there is provided an electric power steering device for transmitting the rotation of a steering assisting electric motor to a steering mechanism through a small gear and a large gear, comprising: a first member disposed on the rotary shaft of said electric motor; a second member disposed at one end of the small gear; and an elastic member interposed between the first and second members for transmitting a torque between the two members, wherein said elastic member has a first elastic modulus corresponding to the case, in which the torsion angle between the first and second members is less than a predetermined angle, and a second elastic modulus corresponding to the case, in which said torsion angle is not less than the predetermined angle, and wherein said first elastic modulus is smaller than said second elastic modulus.

In the invention, in case the steering member is steered at a small angle while the vehicle is running straight, the elastic member can be easily deformed at the smaller first elastic modulus. Within this small angle range, the steering member can be steered without dragging the rotary shaft of the inactive electric motor. As a result, the starting torque of the steering member at the time of starting the steering operation from the straight running state does not rise so that the steering feeling is improved.

In claim 1, according to the invention of claim 2: said first and second members have protrusions for meshing in a torque transmittable manner while clamping the elastic member in the rotational direction of the rotary shaft; the corresponding protrusions of the first and second members have clamping faces acting as torque transmission faces capable of clamping the elastic member inbetween; and at least either said clamping faces and the clamped faces as the torque transmission faces of the elastic member confronting the former are provided with projections for establishing the first elastic modulus by compressing the elastic member locally when said torsion angle is less than the predetermined angle. In the invention, the two-stage characteristics of the elastic modulus of the elastic member can be easily achieved by the simple structure, in which the projections are merely formed on the elastic member or the protrusions of the first and second members.

In claim 1, according to the invention of claim 3: said first and second members have a plurality of projections for meshing in a torque transmittable manner while clamping the elastic member in the rotating direction of the rotary shaft; said elastic member has a cavity portion; and the elastic member is compressed to bury the cavity portion substantially when said torsion angle is not less than the predetermined angle. In the invention, the two-stage characteristics of the elastic modulus of the elastic member can be easily achieved by the simple structure, in which the cavity portion is merely formed in the elastic member. For example, the elastic member is provided with a portion, which is bifurcated into two branches across a slit to form the cavity portion.

According to claim 4, there is provided a joint for use in an electric power steering device according to claim 1, 2 or 3, comprising: a first member; a second member; and an elastic member interposed between the first and second members for transmitting a torque between the two members, wherein said elastic member has a first elastic modulus corresponding to the case, in which the torsion angle between the first and second members is less than a predetermined angle, and a second elastic modulus corresponding to the case, in which said torsion angle is not less than the predetermined angle, and wherein said first elastic modulus is smaller than said second elastic modulus.

According to the invention, it is possible to achieve the aforementioned effects of claim 1, 2 or 3 by the elastic member. Moreover, the rotary shaft and the small gear can

DETAILED DESCRIPTION OF THE PREFERRED EMBODIMENTS

Preferred embodiments of the invention will be described with reference to the accompanying drawings.

Figure 1:
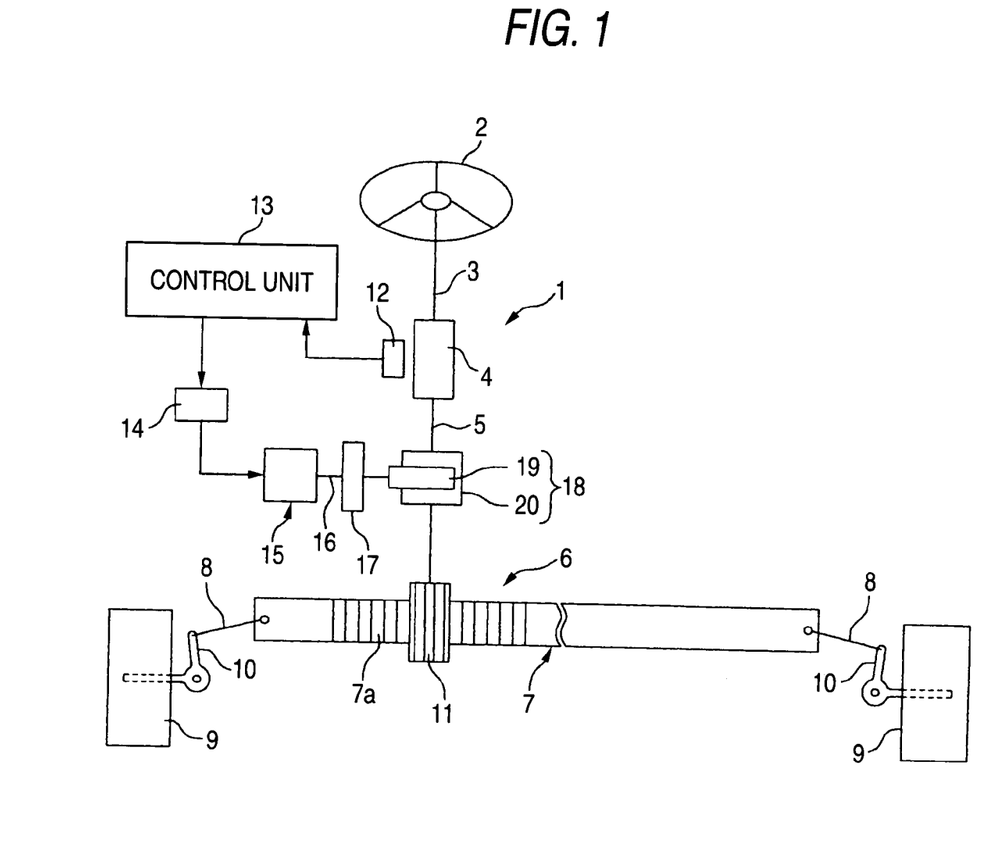
FIG. 1 is a schematic diagram showing a schematic construction of an electric power steering device according to one embodiment of the invention.

FIG. 1 is a schematic diagram showing a schematic construction of an electric power steering device according to one embodiment of the invention. Referring to FIG. 1, this electric power steering device 1 is provided with: a first steering shaft 3 connected integrally and rotatably to a steering member 2 such as a steering wheel; a second steering shaft 5 connected coaxially to the first steering shaft 3 through a torsion bar 4; and a steering mechanism 6 having a rack-and-pinion mechanism leading to the second steering shaft 5.

This steering mechanism 6 is provided with a steering axle 7 arranged to extend transversely of a vehicle, and knuckle arms 10 jointed to the two ends of the steering axle 7 through tie rods 8 thereby to support steering wheels 9. The steering axle 7 is so supported by the not-shown housing as to slide in the axial direction. At a portion of the steering axle 7, there is formed a rack 7a meshing with a pinion 11, which is so disposed at the end portion of the second steering shaft 5 as to rotate together with the second steering shaft 5.

When the steering member 2 is operated to rotate the first and second steering shafts 3 and 5, this rotation is converted by the pinion 11 and the rack 7a into linear motions of the steering axle 7 in the transverse directions of the vehicle. As a result, the steering wheels 9 are steered.

A torque sensor 12 is provided for detecting the steering torque with the relative rotation displacement is through the torsion bar 4 between the first and second steering shafts 3 and 5. The torque detection result of this torque sensor 12 is given to a control unit 13. On the basis of the torque detection result, the control unit 13 controls a voltage to be applied to a steering assisting electric motor 15 through a driver 14. The rotation of the rotary shaft 16 of the electric motor 15 is transmitted through a joint 17 to a reduction mechanism 18, by which it is reduced in speed and transmitted to the second steering shaft 5 thereby to assist the steering operation. The reduction mechanism 18 is provided with a worm shaft 19 as a small gear and a worm wheel 20 as a large gear, which mesh with each other.

Figure 2:
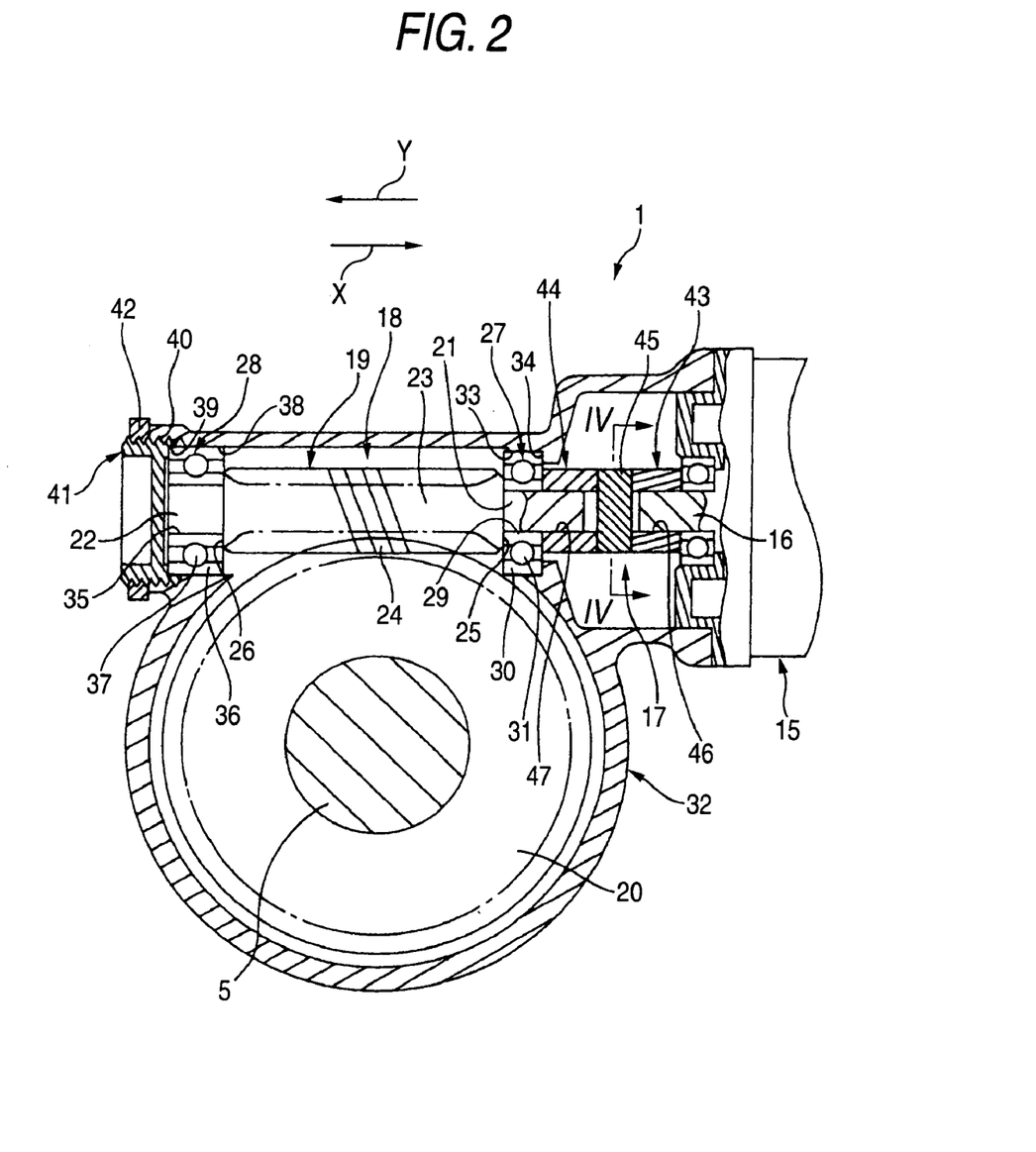
FIG. 2 is a sectional view of an essential portion of the electric power steering device of FIG. 1.

With reference to FIG. 2, the worm shaft 19 is coaxially jointed through the joint 17 to the rotary shaft 16 of the electric motor 15 and has worm teeth 24 formed integrally at its axial intermediate portion.

The worm wheel 20 is constructed, although not shown, to include: an annular mandrel so jointed to the second steering shaft 5 as to rotate together, and an annular synthetic resin member having teeth formed on its outer circumference and fitted on the mandrel. This mandrel is inserted into a mold, for example, when the synthetic resin member is molded of the resin.

The worm shaft 19 is arranged to intersect the core of the second steering shaft 5. The worm shaft 19 has first and second end portions 21 and 22 opposed to each other in the axial direction. Worm teeth 24 are formed at an intermediate portion 23 between those end portions 21 and 22. These first and second end portions 21 and 22 are radially reduced from the intermediate portion 23, and positioning step portions 25 and 26 are formed between the intermediate portion 23 and the end portions 21 and 22, respectively.

The first and second end portions 21 and 22 of the worm shaft 19 are rotatably supported by respectively corresponding first and second bearings 27 and 28.

The first bearing 27 is made of a rolling bearing such as a ball bearing and is provided with an inner ring 29, an outer ring 30 and rolling elements 31. The inner ring 29 of the first bearing 29 is fitted and fixed on the first end portion of the worm shaft 19. One end portion of the inner ring 29 of the first bearing 27 abuts against the positioning step portion 25 of the worm shaft 19 thereby to regulate the movement of the worm shaft 19 in a first axial direction X (to the motor in the axial direction).

On the other hand, the outer ring 30 of the first bearing 27 is fitted in a bearing hole 33 of a housing 32 for housing the reduction mechanism 18. One end portion of the outer ring 30 of the first bearing 27 is positioned in abutment against a positioning step portion 34 of the housing 32 thereby to regulate the movement of the outer ring 30 in the first axial direction X.

The second bearing 28 is made of a rolling bearing such as a ball bearing and is provided with an inner ring 35, an outer ring 36 and rolling elements 37. The inner ring 35 of the second bearing 28 is fitted and fixed on the second end portion of the worm shaft 19. One end portion of the inner ring 35 of the second bearing 28 abuts against the positioning step portion 26 of the worm shaft 19 thereby to regulate the movement of the worm shaft 19 in a second axial direction Y (opposed to the first axial direction X). As a result, the intermediate portion 23 of the worm shaft 19 is axially clamped between the inner rings 29 and 35 of the first and second bearings 27 and 28.

On the other hand, the outer ring 36 of the second bearing 28 is fitted in a bearing hole 38 of the housing 32. This bearing hole 38 leads to a threaded hole 39 opened to the outside, and a pre-load adjusting member 41 having a threaded portion on its outer circumference is screwed into that threaded hole 39.

This adjusting member 41 abuts against one end portion of the outer ring 36 of the second bearing 28 thereby to bias the outer ring 36 in the first axial direction X. This biasing force by the adjusting member 41 is applied to the outer ring 30 through the rolling elements 37 and the inner ring 35 of the second bearing 28, the worm shaft 19, and the inner ring 29 and the rolling elements 31 of the first bearing 27, and the movement of the outer ring 30 in the first axial direction is regulated by the positioning step portion 34. Therefore, the pre-load according to the screwed position of the adjusting member 41 is applied to the first and second bearings 27 and 28. Here in FIG. 2, reference numeral 42 designates a lock nut for locking the screwed position of the adjusting member 41. This lock nut 42 is screwed into the threaded portion of the adjusting member 41.

The joint 17 is provided with: a first member 43 so connected to the rotary shaft 16 of the electric motor 15 as to rotate together; a second member 44 so connected to the first end portion 21 of the worm shaft 19 as to rotate together and confronting the first member 43; and an elastic member 45 interposed between the first and second members 43 and 44 thereby to transmit the torque between the two members 43 and 44. The first and second members are made of a metal, for example, and the elastic member 45 is made of synthetic resin or synthetic rubber having elasticity.

The first member 43 is formed of an annular member having a connection hole 46 such as a press-fit hole at its center. The rotary shaft 16 of the electric motor 15 is press-fitted in the connection hole 46 so that the first member 43 and the rotary shaft 16 are so jointed as to rotate together.

The second member 44 is formed of an annular member having a joint hole 47 such as a serrated hole at its center. In this joint hole 47, there is inserted the protruding portion of the first end portion of the worm shaft 19 from the first bearing 27, so that the second member 44 and the worm shaft 19 are jointed integrally rotatably by the serration joint, for example.

Figure 3:
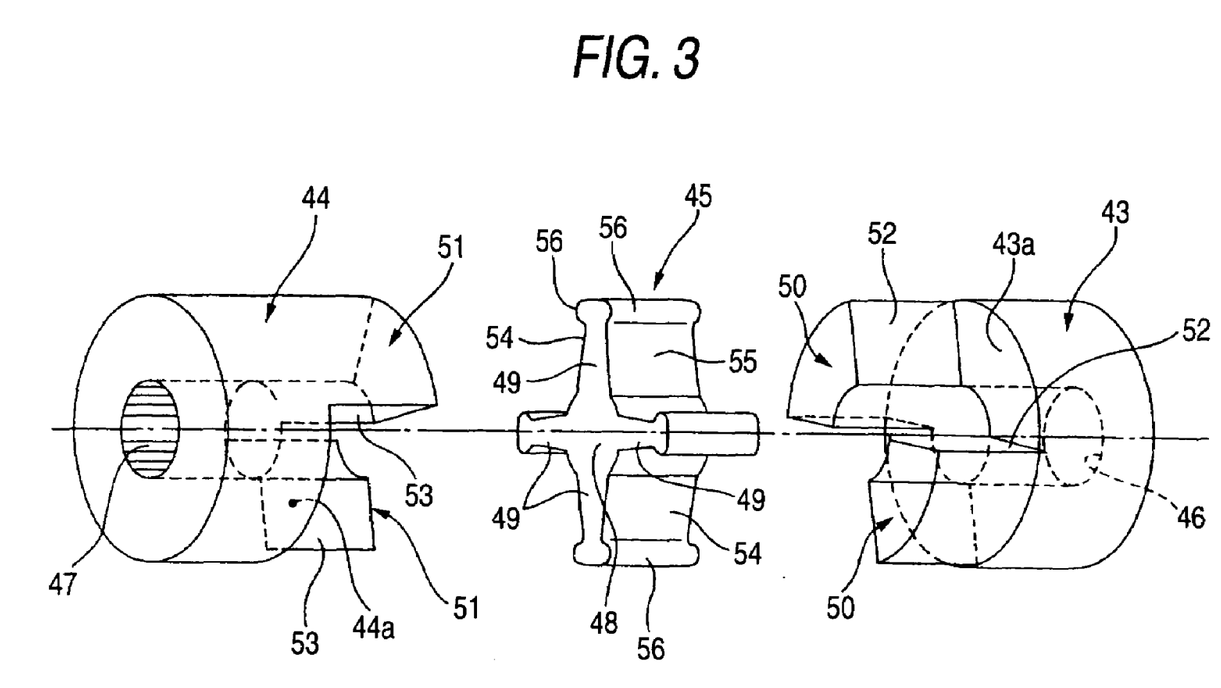
FIG. 3 is an exploded perspective view of a joint.
Figure 4:
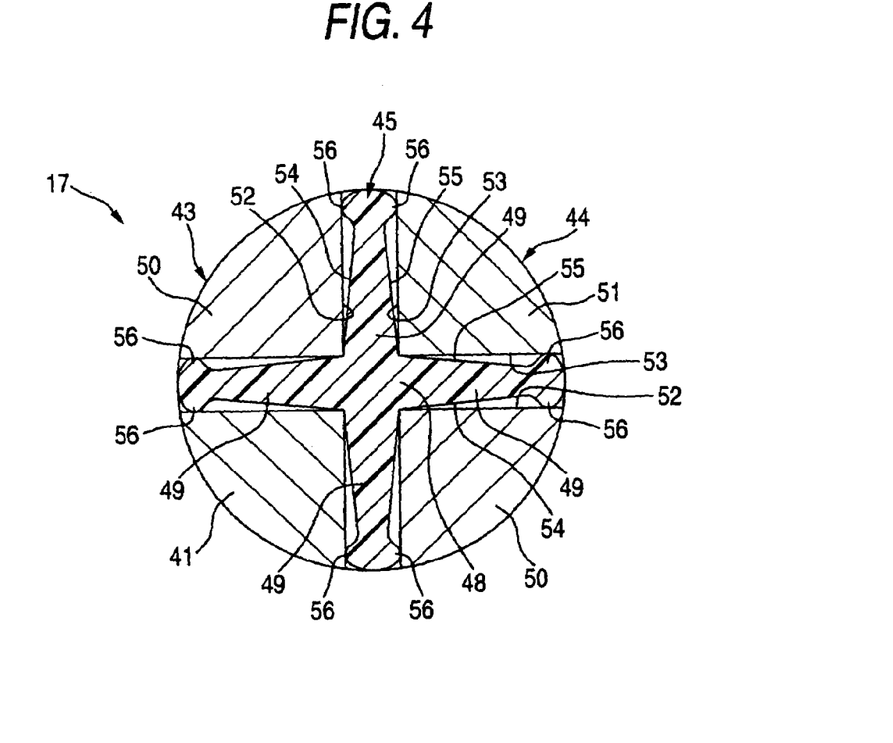
FIG. 4 is a sectional view taken along line IV—IV of FIG. 2.

With reference to FIG. 3 presenting an exploded perspective view of the joint 17 and FIG. 4 presenting a sectional diagram taken along line IV—IV of FIG. 2, the elastic member 45 is formed in a star shape having a plurality of plate-shaped clamped portions 49 extending radially from the body portion 48 at its center.

With reference to FIG. 3, the axial opposed portions 43a and 44a of the first and second members 43 and 44 have a plurality of protrusions 50 and 51, respectively, at a circumferentially equal spacing, and these protrusions 50 and 51 are made to mesh with each other in a staggered relation to clamp the corresponding clamped portions 49 of the elastic member 45, as shown in FIG. 4.

With reference to FIG. 4, the individual protrusions 50 and 51 are provided with clamping faces 52 and 53 acting as torque transmission faces, which are formed of flat faces opposed in the circumferential direction when the protrusions 50 and 51 are in meshing engagement with each other. Between these clamping faces 52 and 53, there are clamped the corresponding clamped portions 49 of the elastic member 45.

On the other hand, the clamped portions 49 of the elastic member 45 have clamped faces 54 and 55 as the torque transmission faces, which are opposed to the clamping faces 52 and 53 as the toque transmission faces of the protrusions 50 and 51. The clamped faces 54 and 55 have projections 56 formed at portions close to the leading ends of the clamped portions 49. Specifically, the clamped portions 49 are gradually narrowed from the root end portions to the leading end portions but are widened at the portions of the projections 56.

When the angle of torsion between the first and second members 43 and 44 is small, the projections 56 of the clamped faces 54 or 55 of the elastic member 45 come exclusively into abutment against the corresponding clamping faces 52 or 53 in accordance with the torsional direction so that the elastic member 45 is locally compressed. When the torsion angle is large, on the other hand, the clamped faces 54 or 55 of the elastic member 45 come generally wholly into abutment of the corresponding clamped faces 52 or 53 so that the elastic member 45 is wholly compressed. As a result, the elastic member 45 has an elastic modulus of two-stage characteristics with respect to the torsion angle.

Figure 5:
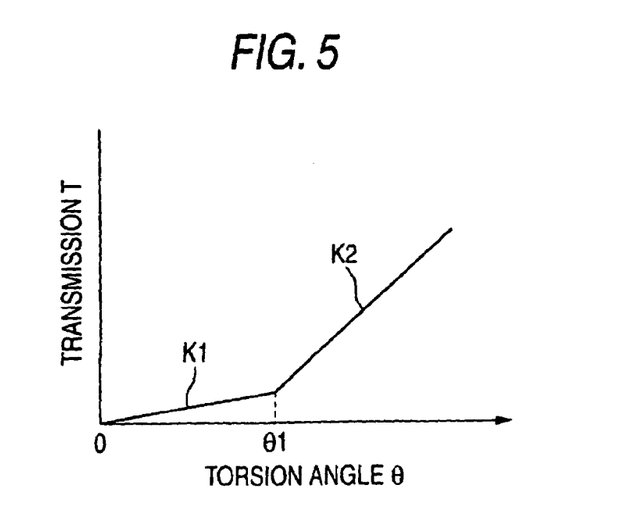
FIG. 5 is a graphic diagram illustrating a relation between a torsion angle θ between the first and second members of the joint, and a transmission torque T by an elastic member.

Specifically, reference is made to FIG. 5 illustrating a relation between the torsion angle $\theta$ between the first and second members 43 and 44 and the transmission torque T by the elastic member 45. When the torsion angle $\theta$ is smaller than a predetermined angle $\theta1$ ($\theta<\theta1$), a smaller first elastic modulus K1 is achieved as the changing rate of the transmission torque T to the torsion angle $\theta$. When the torsion angle $\theta$ is not smaller than the predetermined angle $\theta1$ ($\theta\geq\theta1$), a larger second elastic modulus K2 is achieved as the changing rate of the transmission torque T. The first elastic modulus K1 is set smaller by 1/20 to 1/50, for example, than the second elastic modulus K2 (K1<K2).

According to this embodiment, in case the steering member 2 is steered at a small angle while the vehicle is running straight, and when the electric motor 15 is in an inactive state establishing no steering assisting force, the steering member 2 can be lightly operated by deforming the elastic member 45 easily at the smaller first elastic modulus K1 without dragging the inactive electric motor 15 (i.e., without turning it as a load). Therefore, the starting torque of the steering member 2 at the time of starting the steering operation from the straight running state does not rise so that the steering feeling is improved.

Especially, the elastic member 45 can be given the two-stage characteristics of the first and second elastic moduli K1 and K2 by the simple structure, in which the projections 56 are merely formed on the clamped faces 54 and 55 as the torque transmission faces of the elastic member 45, as opposed to the clamping faces 52 and 53 as the torque transmission faces of the protrusions 50 and 51 of the first and second members 43 and 44. Moreover, the elastic member 45 may be a homogeneous member so that the manufacturing cost can be lowered.

Here, each of the clamped faces 54 and 55 may have a plurality of projections 56.

Figure 6:
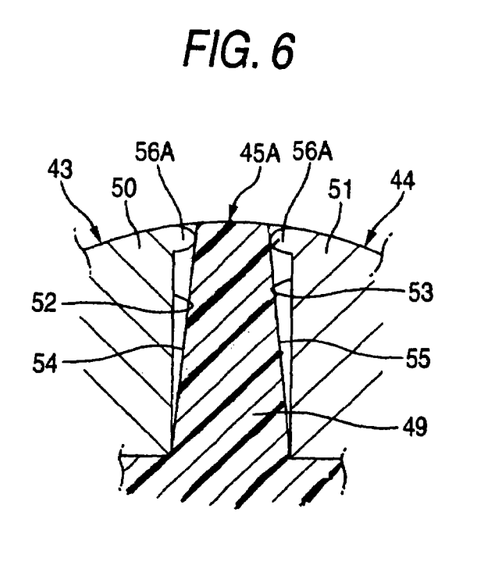
FIG. 6 is a sectional view of a joint according to another embodiment of the invention.

Next, FIG. 6 shows another embodiment of the invention. With reference to FIG. 6, this embodiment is different from that of FIG. 4 in the following point. In the embodiment of FIG. 4, the projections 56 are formed on the clamped faces 54 and 55 as the torque transmission faces of the elastic member 45. In this embodiment, on the contrary, the two-stage characteristics of an elastic member 45A is achieved by forming projections 56A on the clamping faces 52 and 53 as the torque transmission faces of the protrusions 50 and 51 of the first and second members 43 and 44. Each of the clamping faces 52 and 53 may have a plurality of projections 56A. Moreover, the description of the components of FIG. 6 similar to those of the embodiment of FIG. 4 is omitted by designating them by the common reference numerals.

Figure 7:
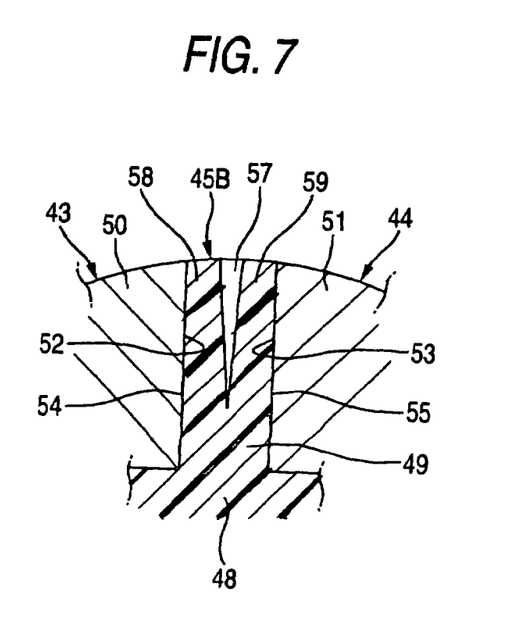
FIG. 7 is a sectional view of a joint according to still another embodiment of the invention.

Next, FIG. 7 shows still another embodiment. With reference to FIG. 7, this embodiment is different from that of FIG. 4 in the following point. In the embodiment of FIG. 4, the projections 56 are formed on the clamped faces 54 and 55 as the torque transmission faces of the elastic member 45. In this embodiment, those projections are omitted, and a slit 57 is formed as a cavity portion extending from the leading end of the clamped portion 49 toward the body portion 48 of an elastic member 45B, thereby to form a pair of branch portions 58 and 59 bifurcated across the slit 57. The outer side portions of the branch portions 58 and 59 are diverged the more to the leading end. The description of the components of FIG. 7 similar to those of the embodiment of FIG. 4 is omitted by designating them by the common reference numerals.

In this embodiment, when the torsion angle between the first and second members 43 and 44 is small, the paired branch portions 58 and 59 approach each other while reducing the slit 57, so that they are not seriously compressed. After the torsion angle became so large that the slit 57 substantially disappeared, however, the individual branch portions 58 and 59 are subject to the ordinary compression. In this embodiment, too, the two-stage characteristics of the elastic member 45B can be achieved by the simple structure having the slit 57.

Figure 8A:
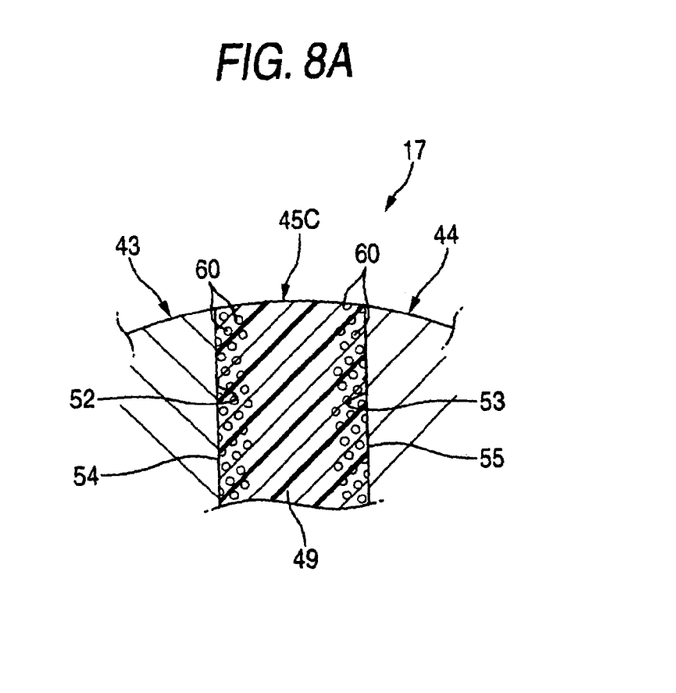
FIGS. 8A and 8B are schematic sectional views showing elastic members individually according to further embodiments of the invention.

Here in this embodiment, the cavity portion can be exemplified by a foam portion 60, which is formed by foaming a portion of an elastic member 45C, as shown in FIG. 8A.

Figure 8B:
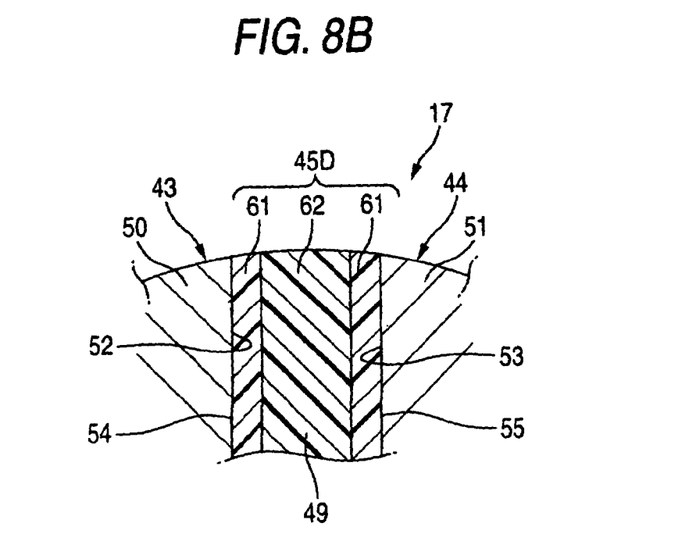

The invention should not be limited to the foregoing individual embodiments but is also enabled to achieve the two-stage characteristics of the elastic modulus by using an elastic member 45D of a laminated structure, in which first layers 61 of a smaller elastic modulus are arranged individually on the clamped faces 54 and 55 and in which a second layer 62 of a larger elastic modulus is arranged as a core layer between the first layers 61.

It is also arbitrary to give the second elastic modulus either characteristics of a plurality stages or characteristics, in which the elastic modulus increases continuously and progressively.

Moreover, the protrusions 56 of each of the first and second members 43 and 44 may be single or three or more. In addition, the small gear and the large gear thus far described may be variously modified within the scope of the claims of the invention into parallel axis gears such as spur gears or helical gears, gears having intersecting axes such as bevel gears, or skew gears such as hypoid gears.

What is claimed is:

1. An electric power steering device for transmitting rotation of a steering assisting electric motor to a steering mechanism through a small gear and a large gear, comprising:
   a first member on a rotary shaft of said electric motor;
   a second member at one end of the small gear; and
   an elastic member between the first and second members for transmitting a torque between the two members,
   wherein said elastic member has a first torsional elastic modulus when a torsion angle between the first and second members is less than a predetermined angle, and a second torsional elastic modulus when said torsion angle is one of equal to and larger than the predetermined angle,
   wherein said first torsional elastic modulus is smaller than said second torsional elastic modulus,
   wherein said elastic member comprises a radially and axially extending plate-shaped portion,
   wherein at least one of said elastic member and said first and second members comprises a circumferentially extending projection at an outer periphery,
   wherein, if said elastic member comprises said circumferentially extending projection, then the circumferentially extending projection contacts said first and second members when no torque or low torque is applied to one of said first and second members, and
   wherein, if at least one of said first and second members comprises said circumferentially extending projection, then a radially extending surface of the circumferentially extending projection contacts said elastic member when no torque or low torque is applied to one of said first and second members.

2. The electric power steering device according to claim 1,
   wherein said elastic member comprises a plurality of radially and axially extending plate-shaped portions,
   wherein said first and second members comprise protrusions for meshing in a torque transmittable manner while clamping the elastic member in a rotational direction of the rotary shaft,
   wherein the corresponding protrusions of the first and second members comprise clamping faces acting as torque transmission faces capable of clamping the elastic member in-between, and
   wherein at least one of said clamping faces and a clamped face of said elastic member as the torque transmission faces of the elastic member confronting the clamping faces comprise a plurality of said circumferentially extending projections for establishing the first torsional elastic modulus by compressing the elastic member locally when said torsion angle is less than the predetermined angle.

3. An electric power steering device for transmitting rotation of a steering assisting electric motor to a steering mechanism, comprising:
   a first member on a rotary shaft of said electric motor;
   a second member at one end of the small gear; and
   an elastic member between the first and second members for transmitting a torque between the two members;
   wherein said first and second members comprise a plurality of projections for meshing in a torque transmittable manner while clamping the elastic member in a rotating direction of the rotary shaft,
   wherein said elastic member comprises a projection having a bifurcated structure defining a slit portion, and
   wherein the elastic member is compressed to collapse the slit cavity substantially when said torsion angle is one of equal to and larger than the predetermined angle.

4. A joint for use in an electric power steering device, comprising:
   a first member;
   a second member; and
   an elastic member between the first and second members for transmitting a torque between the two members,
   wherein said elastic member has a first torsional elastic modulus when a torsion angle between the first and second members is less than a predetermined angle, and a second torsional elastic modulus when said torsion angle is one of equal to and larger than the predetermined angle,
   wherein said first torsional elastic modulus is smaller than said second torsional elastic modulus,
   wherein said elastic member comprises at least one radially and axially extending plate-shaped portion,
   wherein at least one of said plate-shaped portion and said first and second members comprises a circumferentially extending projection at an outer periphery,
   wherein, if said plate-shaped portion comprises said circumferentially extending projection, then the circumferentially extending projection contacts said first and second members when no torque or low torque is applied to one of said first and second members, and
   wherein, if at least one of said first and second members comprises said circumferentially extending projection, then a radially extending surface of the circumferentially extending projection contacts said first and second members when no torque or low torque is applied to one of said first and second members.

5. A joint for use in an electric power steering device, comprising:
a first member;
a second member; and
an elastic member between the first and second members for transmitting a torque between the two members,
wherein said elastic member has a first torsional elastic modulus when a torsion angle between the first and second members is less than a predetermined angle, and a second torsional elastic modulus when said torsion angle is one of equal to and larger than the predetermined angle,
wherein said first torsional elastic modulus is smaller than said second torsional elastic modulus, and
wherein said elastic member comprises a projection having a bifurcated structure defining a slit portion.

6. A joint for use in an electric power steering device, comprising:
a first member;
a second member; and
an elastic member between the first and second members for transmitting a torque between the two members;
wherein said elastic member has a first torsional elastic modulus when a torsion angle between the first and second members is less than a predetermined angle, and a second torsional elastic modulus when said torsion angle is one of equal to and larger than the predetermined angle,
wherein said first torsional elastic modulus is smaller than said second torsional elastic modulus, and
wherein said elastic member comprises:
a first layer having a first elastic modulus; and
a second layer having a second elastic modulus that is higher than said first elastic modulus.

7. An electric power steering device comprising:
a first member comprising a rotary shaft of an electric motor;
a second member comprising a gear of a steering mechanism; and
an elastic member between the first member and the second member and having at least a two-stage torsional elastic modulus,
wherein said two-stage torsional elastic modulus comprises a first torsional elastic modulus corresponding to a first range of torsion angles and a second torsional elastic modulus corresponding to a second range of torsion angles, and
wherein said elastic member comprises:
a first layer having a first elastic modulus; and
a second layer having a second elastic modulus that is higher than said first elastic modulus.

8. The device of claim 7, wherein said first torsional elastic modulus corresponds to an angle between the first and second members that is less than a predetermined angle and said second torsional elastic modulus is larger than the first torsional elastic modulus when the angle between the first and second members is one of equal to and larger than the predetermined angle.

9. An electric power steering device comprising:
a first member comprising a rotary shaft of an electric motor;
a second member comprising a gear of a steering mechanism; and
an elastic member between the first member and the second member and having at least a two-stage torsional elastic modulus,
wherein said two-stage torsional elastic modulus comprises a first torsional elastic modulus corresponding to a first range of torsion angles and a second torsional elastic modulus corresponding to a second range of torsion angles,
wherein said first torsional elastic modulus corresponds to an angle between the first and second members that is less than a predetermined angle and said second torsional elastic modulus is larger than the first torsional elastic modulus when the angle between the first and second members is one of equal to and larger than the predetermined angle, and
wherein said elastic member comprises a foam portion having said first elastic modulus.

10. The device of claim 7, wherein said first and second layers extend radially outward from a body portion of said elastic member.

11. The device of claim 7, wherein said first layer comprises two first layers that sandwich said second layer.

12. The device of claim 7, wherein each of said first member and said second member comprises a protrusion.

13. The device of claim 7, wherein said elastic member comprises:
a body portion; and
a plurality of plate-shaped portions radially extending from said body portion.

14. The device of claim 3, wherein said bifurcated structure comprises a pair of branch portions defining said slit portion between said pair of branch portions.

15. The joint of claim 5, wherein said bifurcated structure comprises a radially extending bifurcated structure.

16. The joint of claim 5, wherein said bifurcated structure comprises a pair of branch portions defining a slit between the pair of branch portions.

17. The joint of claim 6, wherein each of said first and second layers extends radially and axially.

18. The device of claim 7, wherein each of said first and second layers extends radially and axially.

19. The device of claim 1, wherein said elastic member comprises said circumferentially extending projection and the circumferentially extending projection contacts said first and second members when no torque is applied to one of said first and second members.

20. The device of claim 1, wherein one of said first and second members comprises said circumferentially extending projection and said circumferentially extending projection contacts said elastic member when no torque is applied to one of said first and second members.

21. The device of claim 1, wherein said first member comprises a connection hole that receives said rotary shaft in a press-fit condition.

22. The device of claim 1, wherein said second member comprises a serrated joint hole that receives a protruding portion of said small gear.

* * * * *